United States Patent van Ghemen et al.

[11] Patent Number: 6,048,643
[45] Date of Patent: Apr. 11, 2000

[54] PROCESS FOR PREPARING LITHIUM INTERCALATION COMPOUNDS

[75] Inventors: Max van Ghemen, Darmstadt; Birgit Sauerbrey, Bensheim; Ludwig Pohl, Darmstadt, all of Germany

[73] Assignee: Merck Patent Gesellschaft, Germany

[21] Appl. No.: 09/247,333

[22] Filed: Feb. 10, 1999

Related U.S. Application Data

[62] Division of application No. 08/622,305, Mar. 27, 1996, Pat. No. 5,879,654.

[30] Foreign Application Priority Data

Mar. 28, 1995 [DE] Germany .................. 195 11 355

[51] Int. Cl.⁷ .............. H01M 4/32; H01M 4/50; H01M 4/52
[52] U.S. Cl. ............ 429/218; 429/223; 429/224
[58] Field of Search ................. 429/218, 223, 429/224; 423/593, 594, 599

[56] References Cited

U.S. PATENT DOCUMENTS 5,531,920   7/1996   Mao et al. ............... 429/224

FOREIGN PATENT DOCUMENTS 3-98262   4/1991   Japan .
2276155   9/1994   United Kingdom ............ 423/599

OTHER PUBLICATIONS

WO 94/22767 published Oct. 13, 1994.

*Primary Examiner*—Wayne Langel
*Attorney, Agent, or Firm*—Millen, White, Zelano & Branigan, P.C.

[57] ABSTRACT

The invention relates to a process for preparing lithium intercalation compounds by thermal solid state reaction of mixtures of lithium hydroxide or lithium oxide and oxides or oxide precursors of transition metals. A significant step of this process is the treatment of an aqueous suspension of the raw material components lithium hydroxide or lithium oxide and metal oxide or metal oxide precursors with hydrogen peroxide, resulting in the lithium compound going into solution. In the drying of the mixture, the lithium hydroxide is very uniformly absorbed onto the metal oxide. Calcination at temperatures between 450° C. and 700° C. results in complete reaction to form the lithium intercalation compound in less than 5 hours.

15 Claims, 2 Drawing Sheets

PROCESS FOR PREPARING LITHIUM INTERCALATION COMPOUNDS

This is a divisional of application Ser. No. 08/622,305 filed Mar. 27, 1996 U.S. Pat. No. 5,879,654. Priority of application Serial No. DE 8 95 11 355.1 filed on Mar. 28, 1995 in Germany is claimed under 35 U.S.C. §119.

The invention relates to a process for preparing lithium intercalation compounds.

Transition metal oxides have the property of being able to intercalate metal ions of suitable size, i.e. to insert them at lattice sites and/or interstitial sites of their crystal lattice. This process can be reversible under certain conditions.

Of particular industrial and economic importance are lithium-transition metal intercalation compounds such as, in particular, lithium-manganese oxides, lithium-nickel oxides and lithium-cobalt oxides. Typical representatives of such compounds are $LiMn_2O_4$, $Li_2Mn_2O_4$, $LiCoO_2$ and $LiNiO_2$. Apart from the intercalation compounds of discrete stoichiometry which have been mentioned, corresponding forms having a nonstoichiometric composition, particularly in respect of the lithium content, are known. Furthermore, mixed transition metal oxides and oxides doped with further elements can also form the basis of intercalation compounds. The $LiMn_2O_4$ spinel is the focus of interest, since this compound is low-cost and environmentally friendly in respect of starting materials and preparation. The compounds specified have the property of a mixed electron/ion conductivity. Under a certain potential difference, $Li^+$ ions can be intercalated in or again taken out of the crystal lattices of these compounds. These compounds are therefore suitable for producing electrode materials for lithium batteries and, in particular, lithium secondary batteries. The lithium intercalation compounds are normally used as cathode material. The electrodes are produced in principle by pressing finely divided lithium-transition metal oxide and carbon (graphite or carbon black) with an organic binder. A lithium secondary battery cell is generally composed of such an intercalation cathode, an anode based on metallic lithium or carbon and a nonaqueous electrolyte containing lithium ions. The important things required of such batteries are a high capacity, a long life over many charge/discharge cycles with the capacity remaining as constant as possible and with constant potential. It has been found that the quality of the lithium intercalation compound used is an important criterion in deciding these properties with the features of crystal structure, morphology and particle size being of particular importance. These features depend to a particular degree on the manner in which the intercalation compound is prepared.

Most of the processes which have become known for this are based on the "mixed oxide process", the central feature of which is a thermal solid state reaction in which the corresponding oxides react to form the lithium intercalation compound. For this purpose, the corresponding oxides or oxide precursors such as hydroxide, e carbonates, nitrates, acetates; etc. are repeatedly mixed, milled and fired. The central thermal solid state reaction requires, depending on particle fineness of the components and the intensiveness of their mixing, temperatures between 500 and 1000° C. and reaction times of at least 24 hours, but generally of a number of days, to, achieve complete reaction and the desired quality features (see, for example: Guyomard et al ., Solid State Ionics 69 (1994) 222–237). Depending on the choice of starting materials and their oxidation state and the desired end product this applies particularly to systems based on manganese oxide, it can be necessary to carry out the thermal solid state reaction in an oxidizing, reducing or inert atmosphere.

Other, process principles for producing a very homogeneous premixing of the components for instance the sol gel process (see, for example, WO 92/18425), may possibly in individual cases, lead to a certain reduction of reaction temperature and reaction time in the solid state reaction. On the other hand however, owing to the significantly more expensive starting materials the more expensive reaction procedure and control, they are less suitable for technical and, particularly, industrial use.

The mixed oxide process therefore remains at the focus of interest, since it is basically simple and can easily be carried out on an industrial scale, even if the high reaction temperatures and long reaction times required are considered very disadvantageous.

It is therefore an object of the present invention to improve the mixed oxide process for preparing lithium intercalation compounds in respect of important process parameters such as reaction time and reaction temperature.

It has now surprisingly been found that when an aqueous suspension of the mixture of the raw material components lithium hydroxide or lithium oxide and metal oxide or metal oxide precursors is treated with hydrogen peroxide, the lithium compound which itself is sparingly soluble in water goes into solution and on drying of the mixture is very uniformly absorbed onto the metal oxide. This gives an extremely homogeneous mixture of the components which can be reacted completely to give the lithium intercalation compound in less than 5 hours by calcination at temperatures between 450 and 700° C.

The invention accordingly provides a process for preparing lithium intercalation compounds by thermal solid state reaction of mixtures of lithium hydroxide or lithium oxide and oxides or oxide precursors of transition metals, which is characterized by the following steps:

a) mixing finely divided powders of the components in the corresponding stoichiometric ratio in aqueous suspension b) addition of hydrogen peroxide c) evaporation of the reaction mixture and drying of the powder d) calcination of the powder.

Figure 1:
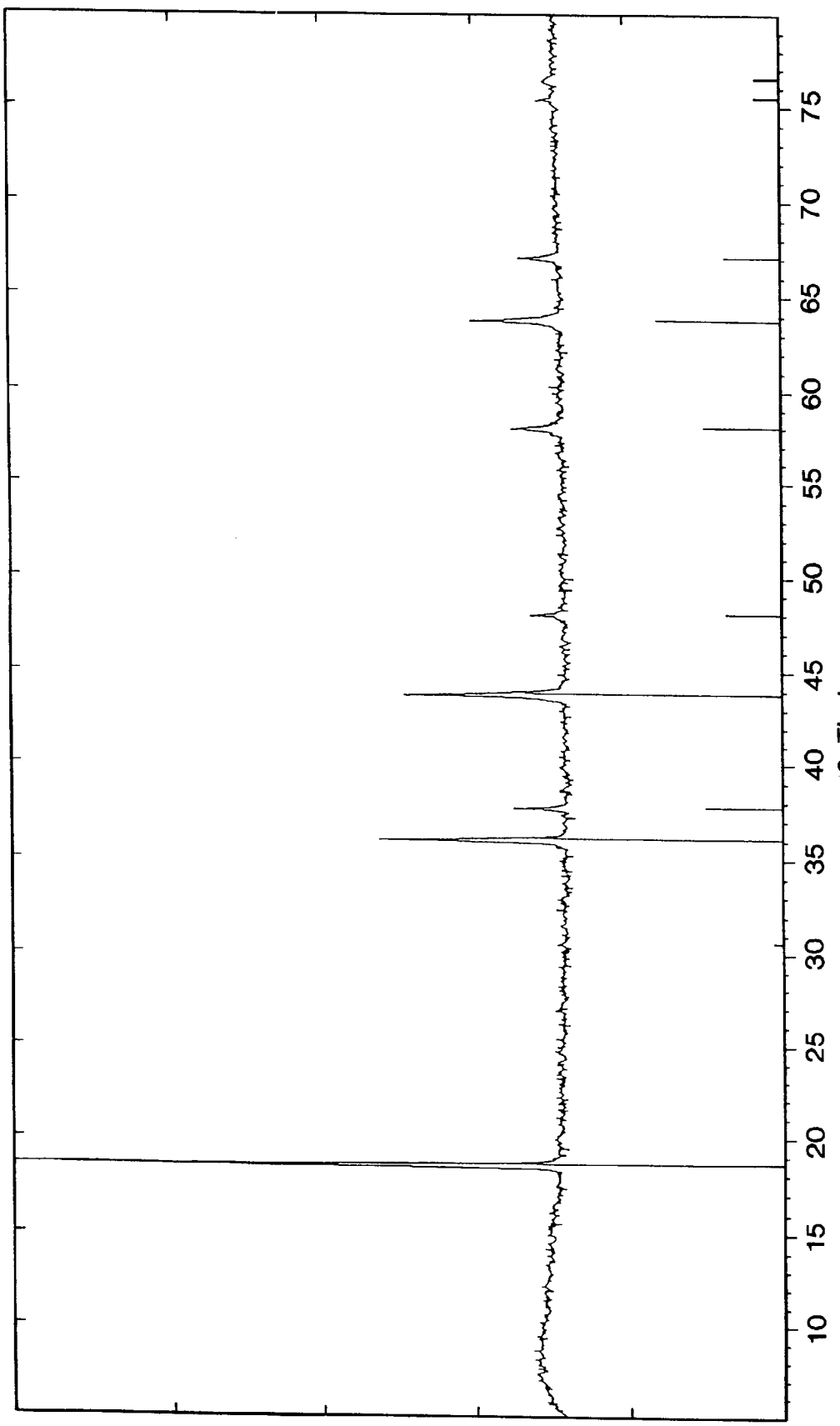
FIG. 1 shows the X-ray diffraction pattern of $LiMn_2O_4$ prepared by the process of the present invention (see Example 1). After calcining in air for 2 hours at 700° C., only the peaks characteristic of $LiMn_2O_4$ appear at 2-theta values of 18.611, 36.086, 37.748, 43.870, 48.048, 58.058, 63.782, 67.081, 75.528, 76.549.

The lithium-containing starting material used for the process of the present invention is lithium hydroxide ($LiOH.H_2O$) or lithium oxide. Starting materials used as transition metal components are first and foremost the oxides of manganese ($MnO_2$), nickel (NiO) and cobalt ($Co_3O_4$). The transition metal components used can equally well be corresponding oxide precursors, i.e. those compounds which are easily converted thermally into the oxides. These can be corresponding hydroxides such as $Ni(OH)_2$ or carbonates, nitrates and acetates. However, preference is given to the oxides since these are generally less expensive. All these substances are commercially available as finely divided powder products and in appropriate quality. The maximum particle size should advantageously not exceed 1000 μm. If necessary, the material should be milled first. Powders having particle sizes of about 1–250 μm are favourable.

In the first step of the process of the present invention, the respective finely divided powder components are mixed in the appropriate stoichiometric ratio as in the desired end product and are slurried in water to form a suspension.

For $LiMn_2O_4$, lithium hydroxide and manganese dioxide are mixed in a molar ratio of 1:2, for $Li_2Mn_2O_4$ in a molar ratio of 1:1. For $LiNiO_2$, lithium hydroxide and nickel oxide are mixed in a molar ratio of 1:1 and for $LiCoO_2$ lithium hydroxide and cobalt oxide ($Co_3O_4$) are mixed in a ratio of 3:1. The slurrying of the powder mixture in water serves essentially to keep the decomposition reaction after the addition of hydrogen peroxide in the second process step under control. The reaction should not be too violent but also should not come to a halt. The ratio of water to powder mixture is essentially not critical and can be determined by simple tests with regard to the course of the reaction in the second step. For one mol batches, an amount of water of about 100 ml has been found to be useful in practice.

In the second step of the process of the present invention, hydrogen peroxide is added to the powder suspension while stirring. Here, depending on the concentration of the hydrogen peroxide in the mixture, a more or less vigorous decomposition reaction commences, with oxygen being liberated from the hydrogen peroxide in a known manner. During the course of this reaction, the lithium hydroxide or lithium oxide present in the mixture goes virtually completely into solution. This is surprising, since lithium hydroxide and lithium oxide are per se only sparingly soluble in water and in the end only water results per se from the decomposition of hydrogen peroxide. The hydrogen peroxide required in this process step is used in a molar ratio to the lithium compound of at least 0.3:1. Preference is given to a molar ratio of hydrogen peroxide to lithium hydroxide of from 1:1 to 2:1.

Larger amounts of hydrogen peroxide are not critical per se, but are uneconomical. The hydrogen peroxide is advantageously used in concentrated form, for instance as commercial 30% aqueous solution.

After the reaction has subsided, the reaction mixture is, in the third process step, evaporated and the powder is dried. This results in a very uniform absorption of the lithium hydroxide dissolved in the second step onto the transition metal oxide powder. The evaporation is carried out in a customary way with heating and advantageously under reduced pressure. The same applies to the drying of the powder mixture.

The last step of the process of the present invention comprises the thermal solid state reaction in which the powder mixture is reacted to form the lithium intercalation compound. For this purpose, the powder is calcined at a temperature between 450 and 700° C. It has here been surprisingly found that the reaction is concluded within a time of less than 5 hours. A typical calcination time is from 1 to 3 hours in the temperature range specified. Treatment at a temperature of about 700° C. for a time of 2 hours is advantageous and generally entirely sufficient.

The complete reaction is shown by the X-ray diffraction patterns of the reaction products which show exclusively the reflexions typical of the lithium intercalation compounds (comparison with the ASTM cards for the corresponding materials) and no reflexions of the starting materials or other transition phases. If instead the reaction is carried out by the conventional mixed oxide process, the X-ray diffraction patterns still show reflexions of phases resulting from incomplete reaction after calcination for 5 hours.

The lithium intercalation compounds prepared by the process of the present invention are very suitable as active materials in electrodes, in particular cathodes, of lithium batteries and lithium secondary batteries. Particular preference is here given to the $LiMn_2O_4$ spinel. It has been found that the lithium secondary batteries whose cathodes are made from materials produced according to the present invention have an increased capacity, better constancy of potential and an increased number of charge/discharge cycles.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever.

In the foregoing and in the following examples, all temperatures are set forth uncorrected in degrees Celsius and unless otherwise indicated, all parts and percentages are by weight.

The entire disclosure of all applications, patents and publications, cited above and below, and of corresponding application German DE 19511355.1, are hereby incorporated by reference.

EXAMPLE 1

Preparation of $LinMn_2O_4$ from $MnO_2$ and $LiOH.H_2O$ 1 mol of $LiOH.H_2O$ (41.96 g) and 2 mol of $MnO_2$ (173.88 g) are slurried in 100 ml of $H_2O$. About 1.6 mol (160 ml) of 30% $H_2O_2$ are added in portions to the slurry, with $LiOH.H_2O$ (white grains in the black $MnO_2$ suspension) going into solution. After the reaction has subsided ($O_2$ evolution), the mixture is evaporated almost to dryness on a water bath (at 70° C.) and under reduced pressure (about 80 mbar). The residue is dried further overnight (about 150° C./50 mbar) and comminuted. The powder mixture thus obtained is subsequently calcined for 2 hours in air at 700° C. This gives a loose grey-black, pulverulent product whose X-ray diffraction pattern shows the lines of a well crystallized $LiMn_2O_4$ (FIG. 1).

EXAMPLE 2

Preparation of $LiMn_2O_4$ from $MnO_2$ and $LiOH.H_2O$ (Comparative Experiment)

Figure 2:
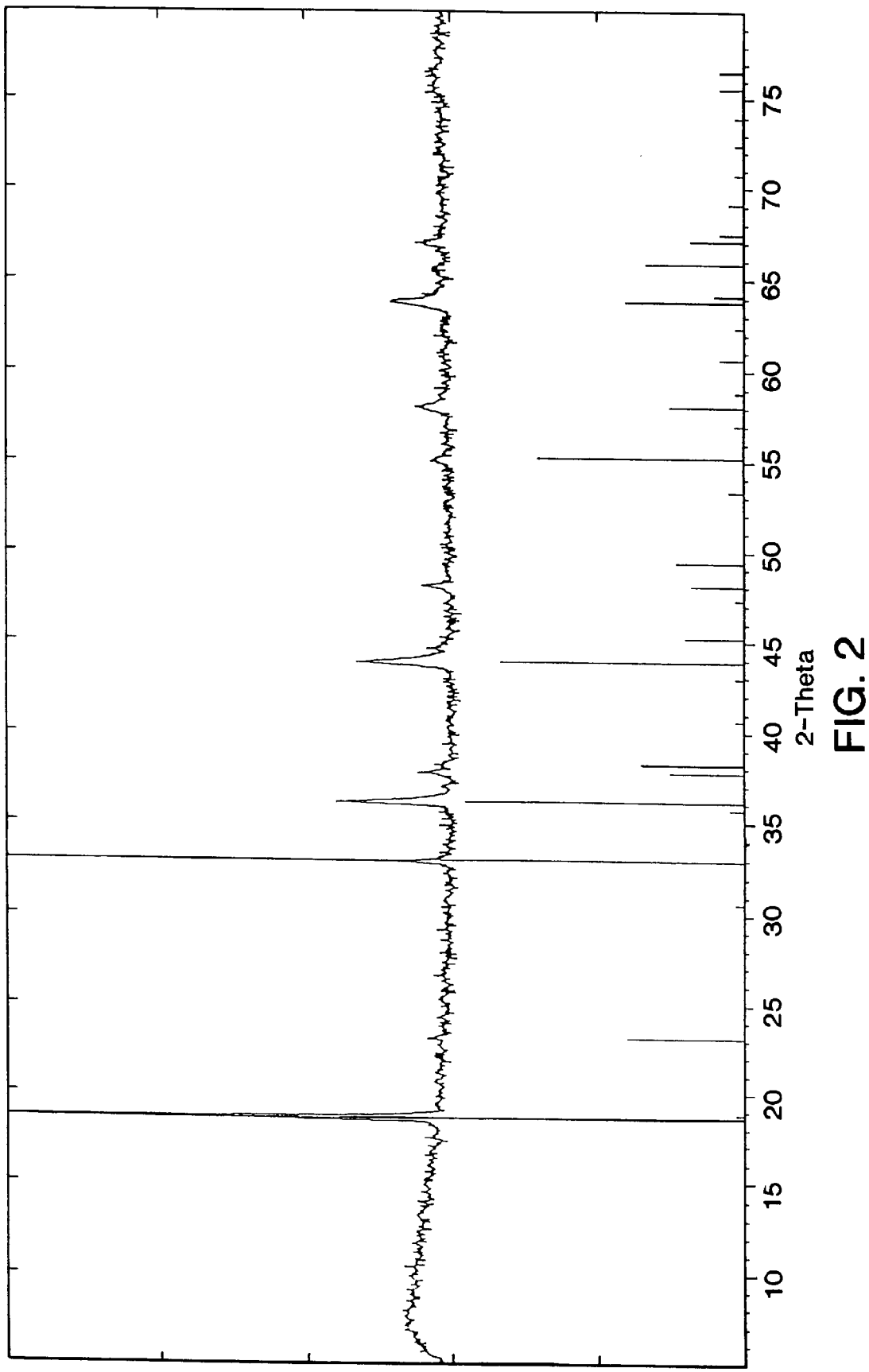
FIG. 2 shows the X-ray diffraction pattern of $LiMn_2O_4$ prepared by the mixed oxide process corresponding to the prior art (see Example 2). After calcining in air for 5 hours at 700° C., the pattern shows not only the peaks characteristic of $LiMn_2O_4$ (see FIG. 1) but also, owing to incomplete reaction, distinct signals of $Mn_2O_3$ at 2-theta values of 23.120, 32.921, 38.201, 55.141, 65.724.

1 mol of $LiOH.H_2O$ (41.96 g) and 2 mol of $MnO_2$ (173.88 g) are ground for 10 minutes in an agate mortar mill. The powder mixture is subsequently calcined for 5 hours in air at 700° C. This gives a loose, inhomogeneous, grey-black, pulverulent product containing red particles, the X-ray diffraction pattern of the product showing incomplete reaction (FIG. 2).

EXAMPLE 3

Preparation of $LiNiO_2$ From NiO and $LiOH.H_2O$ 1 mol of $LiOH.H_2O$ (41.96 g) and 1 mol of NiO (74.69 g) are slurried in 100 ml of $H_2O$. About 1 mol (100 ml) of 30% $H_2O_2$ is added in portions to the slurry. After the reaction has subsided ($O_2$ evolution), the mixture is evaporated almost to dryness on a water bath (at 70° C.) and under reduced pressure (about 80 mbar). The residue is dried further overnight (about 150° C./50 mbar) and comminuted. The powder mixture thus obtained is subsequently calcined for 1 hour in air at 700° C. The X-ray diffraction pattern shows the lines of a well crystallized $LiNiO_2$.

EXAMPLE 4

Preparation of $LiNiO_2$ From $Ni(OH)_2$ and $LiOH.H_2O$ 1 mol of $LiOH.H_2O$ (41.96 g) and 1 mol of $Ni(OH)_2$ (92.70 g) are slurried in 100 ml of $H_2O$. About 1 mol (100 ml) of 30% $H_2O_2$ is added in portions to the slurry. After the reaction has subsided ($O_2$ evolution), the mixture is evaporated almost to dryness on a water bath (at 70° C.) and under reduced pressure (about 80 mbar). The residue is dried further overnight (about 150° C./50 mbar) and comminuted. The powder mixture thus obtained is subsequently calcined for 1 hour in air at 700° C. The X-ray diffraction pattern shows the lines of a well crystallized $LiNiO_2$.

EXAMPLE 5

Preparation of $LiCoO_2$ From $Co_3O_4$ and $LiOH.H_2O$ 1 mol of $LiOH.H_2O$ (41.96 g) and ⅓ mol of $Co_3O_4$ (80.26 g) are slurried in 100 ml of $H_2O$. About 2 mol (200 ml) of 30% $H_2O_2$ is added in portions to the slurry. After the reaction has subsided ($O_2$ evolution), the mixture is evaporated almost to dryness on a water bath (at 70° C.) and under reduced pressure (about 80 mbar). The residue is dried further overnight (about 150° C./50 mbar) and comminuted. The powder mixture thus obtained is subsequently calcined for 1 hour in air at 700° C. The X-ray diffraction pattern shows the lines of a well crystallized $LiCoO_2$.

The preceding examples can be repeated with similar success by substituting the generically or specifically described reactants and/or operating conditions of this invention for those used in the preceding examples.

From the foregoing description, one skilled in the art can easily ascertain the essential characteristics of this invention, and without departing from the spirit and scope thereof, can make various changes and modifications of the invention to adapt it to various usages and conditions.

We claim:

1. A method of using lithium intercalation compounds as active materials which comprises providing an electrode of a lithium battery or lithium secondary battery which contains said lithium intercalation compounds, wherein said lithium intercalation compounds are prepared by thermal solid state reaction of mixtures of lithium hydroxide or lithium oxide and oxides or oxide precursors of transition metals, which comprises the following steps:

a) mixing in aqueous suspension, finely divided powders of lithium hydroxide or lithium oxide and oxides or oxide precursors of transition metals in a stoichiometric ratio corresponding to the desired lithium intercalation end product;

b) addition of hydrogen peroxide to the aqueous suspension of the mixture of (a);

c) evaporation of the reaction mixture from step (b) and drying of the resulting powder; and d) calcination of the powder from step (c).

2. A method as in claim 1, wherein hydrogen peroxide is used in a molar ratio to lithium hydroxide or lithium oxide of at least 0.3:1.

3. A method as in claim 1, wherein hydrogen peroxide is used in a molar ratio to lithium hydroxide or lithium oxide of from 1:1 to 2:1.

4. A method as in claim 1, wherein the powder is calcined for a period of 1 to 3 hours at a temperature between 450 and 700° C.

5. A method according to claim 1, wherein in the oxides or oxide precursors of transition metals comprise a metal selected from the group consistin of Mn, Co and Ni.

6. A method according to claim 1, wherein in the lithium intercalation compounds are selected from the group consisting of $LiMn_2O_4$, $Li_2Mn_2O_4$, $LiCoO_2$, and $LiNiO_2$.

7. A method as in claim 1, wherein said lithium battery or lithium secondary battery is in a charge cycle.

8. A method as in claim 1, wherein said lithium battery or lithium secondary battery is in a discharge cycle.

9. Intercalation electrodes containing lithium intercalation compounds prepared by thermal solid state reaction of mixtures of lithium hydroxide or lithium oxide and oxides or oxide precursors of transition metals, which comprises the following steps:

a) mixing in aqueous suspension, finely divided powders of lithium hydroxide or lithium oxide and oxides or oxide precursors of transition metals in a stoichiometric ratio corresponding to the desired lithium intercalation end product;

b) addition of hydrogen peroxide to the aqueous suspension of the mixture of (a);

c) evaporation of the reaction mixture from step (b) and drying of the resulting powder; and d) calcination of the powder from step (c).

10. Intercalation electrodes as in claim 9 wherein hydrogen peroxide is used in a molar ratio to lithium hydroxide or lithium oxide of at least 0.3:1.

11. Intercalation electrodes as in claim 9 wherein hydrogen peroxide is used in a molar ratio to lithium hydroxide or lithium oxide of from 1:1 to 2:1.

12. Intercalation electrodes as in claim 9 wherein the oxide or oxides precursors of transition metals comprise a metal selected from the group consisting of Mn, Co and Ni.

13. Intercalation electrodes as in claim 9 wherein the intercalation compounds have a composition selected from the group consisting of $LiMn_2O_4$, $Li_2Mn_2O_4$, $LiCoO_2$ and $LiNiO_2$.

14. Lithium batteries and lithium secondary batteries containing intercalation electrodes according to claim 8.

15. Lithium batteries and secondary batteries as in claim 14 wherein the intercalation electrodes have a composition selected from the group consisting of $LiMn_2O_4$, $LiCoO_2$ and $LiNiO_2$.

* * * * *